No. 645,537.                            Patented Mar. 13, 1900.
P. H. REARDON.
HOSE COUPLING.
(Application filed Sept. 20, 1899.)
(No Model.)
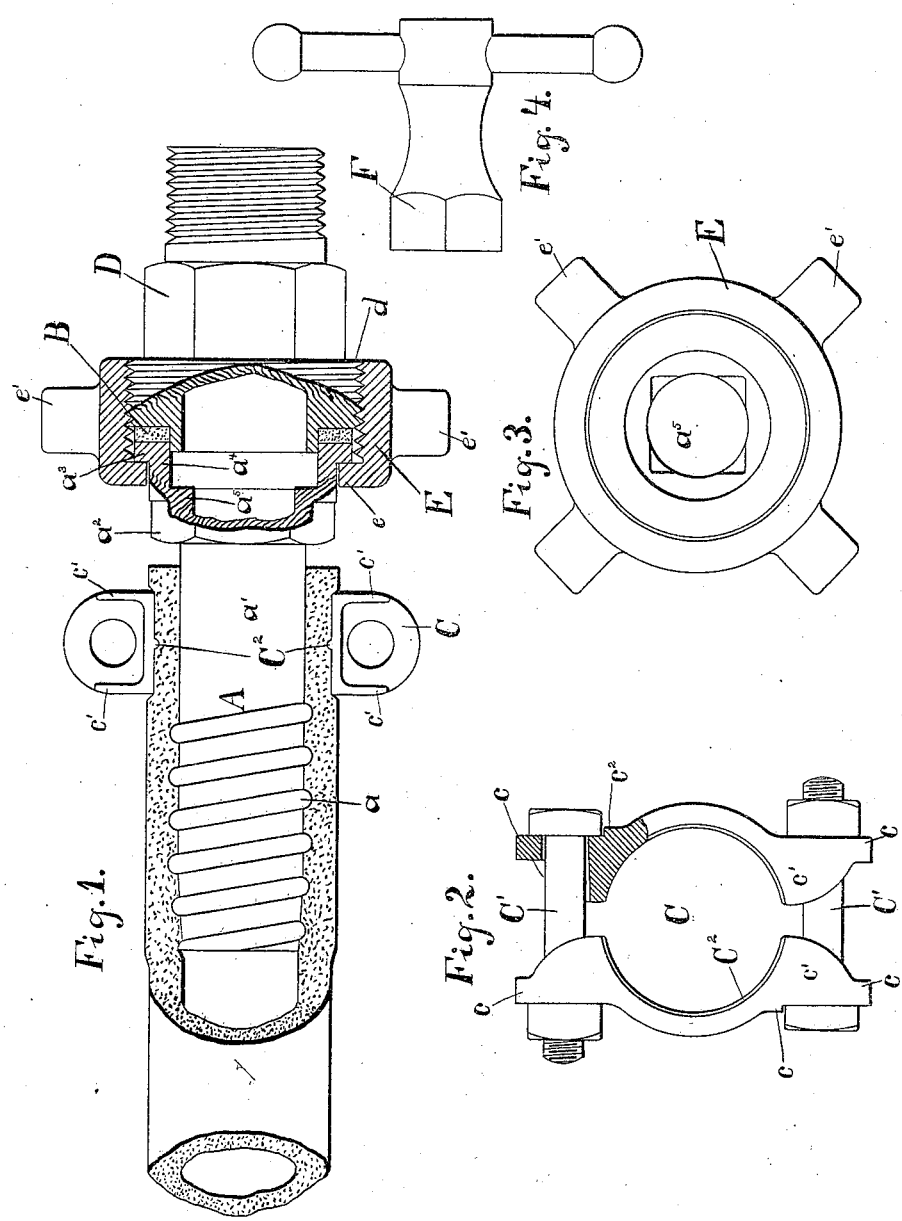
Witnesses:
Jesse R. Eoff.
C. K. Orton
Inventor:
Patrick H. Reardon
By W. H. Smyth
his Atty

UNITED STATES PATENT OFFICE.

PATRICK H. REARDON, OF SAN FRANCISCO, CALIFORNIA.

HOSE-COUPLING.

SPECIFICATION forming part of Letters Patent No. 645,537, dated March 13, 1900.

Application filed September 20, 1899. Serial No. 731,073. (No model.)

*To all whom it may concern:*

Be it known that I, PATRICK H. REARDON, a citizen of the United States, residing at San Francisco, in the county of San Francisco and State of California, have invented certain new and useful Improvements in Hose-Couplings; and I do hereby declare the following to be a full, clear, and exact description of the same.

This invention pertains to couplings or connections and relates to the class of devices for connecting flexible pipes or hose, particularly those subjected to great pressure and which are in consequence very strong and unyielding—as, for example, those used in steam connections and those used in operating rock-drills.

Heretofore much difficulty has been experienced in this form of devices in securing strong unyielding hose upon the metallic coupling. This is largely owing to the great difficulty of forcing the coupling-shank into the hose, which has heretofore been usually accomplished by hammering and direct pressure upon the coupling. The effect of this has been to bruise and deface the joint-surface of the coupling, rendering it short-lived and imperfect to perform its functions, besides mutilating the interior of the hose. Another difficulty with such couplings is the comparative ease with which the hose is pulled off the coupling-shank. This is enhanced by the imperfection of the means at present employed for securing the hose upon the shank.

The objects of the present invention may be stated to be, in general terms, to overcome the difficulties referred to and, more specifically stated, to provide a simple and inexpensive coupling which may be readily secured on and removed from hose of strong and unyielding character without injury to either coupling or hose and to provide a device of this character that the hose will part more readily than pull off the coupling.

I accomplish these objects by means of the devices illustrated in the accompanying drawings, in which—

Figure 1 is a view of the device, partly in section, to more clearly illustrate it. Fig. 2 is a view of the clamp, partly in section, to more clearly illustrate it. Fig. 3 is a plan view of the coupling-ring. Fig. 4 is a view of the key.

Referring to the accompanying drawings, A is a shank of suitable length slightly larger than the interior diameter of the hose to be secured thereon. A portion of its length, commencing with its outer end, is provided with a round or non-angular thread $a$, raised above its surface. This thread extends over only a portion of the shank A, the remainder $a'$ of the shank being plain.

The shank at its outer end for the distance occupied by two or three threads is tapered, being smaller at the end, the threads conforming to the taper, as shown in Fig. 1. It is also provided with a raised hexagonal or otherwise-roughened flange $a^2$ for the reception of a turning-wrench. Beyond the hexagon $a^2$ the shank increases in diameter slightly larger than the hexagonal part and having an outwardly-projecting bearing-flange $a^3$, forming one portion of the coupling proper, the outer surface of this flange $a^3$ being suitably formed for the reception of packing B. The interior of the shank A, at the coupling end, is preferably bored of larger diameter than the normal size for a short distance, and beyond this counterbore $a^4$ it is provided with an angular key-socket $a^5$, shown in Fig. 3 as a square socket located, preferably, within the hexagonal portion.

A clamp C, Figs. 1 and 2, of peculiar construction is employed, which consists of two similar halves connected by bolts. Each half of this clamp consists of an approximately-semicircular band provided with an outwardly-projecting flange $c$, located some distance back of the clamp ends. Strengthening-ribs $c'$, Figs. 1 and 2, are provided on each side of the flange at the inner angle of the junction of the flange with the clamp, as shown in Fig. 2. A shoulder $c^2$ is provided at one end of each half-clamp, Fig. 2, to prevent the turning of the bolt C'. An inwardly-projecting rib $C^2$ is provided on the interior surface of the clamp, adapted to embed itself in the outer surface of the hose. This clamp is located on the plain portion of shank A beyond the rounded threads and between them and the hexagonal portion.

The other portion D of the coupling consists of a threaded portion $d$, somewhat larger in diameter than the flange $a^3$ and having its outer surface turned down to fit the counterbore $a^4$. This end is also provided with a nut-shaped portion or otherwise adapted to receive and be turned by a wrench and is provided with a projecting shank having suitable exterior threads.

A coupling-ring E, Figs. 1 and 3, is provided, having an inwardly-projecting flange $e$, adapted to engage with flange $a^3$ and having internal threads to fit the threaded portion $d$ of the shank D. The ring E is also provided with projecting bosses $e'$, adapted to be engaged by a suitable spanner-wrench.

A suitable key F, fitting the internal key-socket, is provided, as shown in Fig. 4, for screwing the shank into the hose.

To operate the device, the shank A is screwed into the hose by means of the key F, and the internal socket $a^5$ or the hexagonal flange $a^2$ and an ordinary wrench may be used. The clamp being previously slipped over the hose loosely is placed so as to embrace the hose above the non-angular threads and between them and the hexagonal flange and is then tightly clamped by means of the bolts C', the non-angular threads forming a collar to prevent the withdrawal of the hose. The inwardly-projecting rib $C^2$ of the clamp being pressed into the hose also insures against the withdrawal of the hose from the shank. The shoulders $c^2$ by preventing the turning of the bolts facilitate the rapid adjustment of the clamp, and the angle-ribs $c'$ insure the non-breaking of the clamp-flanges when subjected to the necessary hard duty required of them.

Of course, when circumstances require it, the male portion D of the coupling may be supplied with a similar shank to A, with its clamp, non-angular thread, and plain portion, in which form the device will couple lengths of hose together. In the form shown in the drawings the device is adapted to be used in connecting a hose to a rock-drill or other similar requirement.

Having now described my invention, what I claim as new, and desire to secure by Letters Patent, is—

1. A coupling having a shank adapted to enter a hose with a portion of its length provided with non-angular threads, said shank provided with means comprising a circumferentially broken or faceted surface or flange adapted to engage with and be turned by an independent wrench.

2. A coupling having a shank with a portion of its length provided with non-angular threads, said shank provided with means comprising a circumferentially broken or faceted surface or flange adapted to engage with and be turned by an independent wrench and having a portion of its length between said means and the non-angular threads plain, whereby said threads act as a projecting collar to prevent the withdrawal of an exterior hose, a two-part clamp with suitable compression devices and an internal rib adapted to be compressed into the exterior surface of the hose.

3. A hose-connection device comprising a suitable coupling having a shank adapted to enter a hose, and a two-part clamp adapted to embrace said hose having projecting flanges $c$, with ribs $c'$ and an inwardly-projecting rib $C^2$, raised above the normal interior surface of the clamp.

4. A hose-connection device comprising a suitable coupling having a shank adapted to enter a hose and a two-part clamp adapted to embrace said hose having projecting flanges $c$, with ribs $c'$ and an inwardly-projecting rib $C^2$ raised above the normal interior surface of the clamp and each member of the clamp provided with a shoulder $c^2$ to prevent the turning of the bolts.

5. A coupling comprising the shank A with its non-angular threads $a$ extending a portion of its length and having a threadless portion $a'$, the angular flange $a^2$ adapted to be engaged by an exterior wrench and having the angular interior socket $a^5$ adapted to be engaged by an interior wrench, the exterior flange $a^3$, a shank D having an exterior thread $d$, a coupling-ring provided with an interior thread to fit the thread $d$ and an inwardly-projecting flange to engage with the shoulder $a^3$ and having exterior bosses adapted to engage with and be operated by a spanner-wrench.

6. A coupling having a tapering shank adapted to enter a hose having a limited portion of that part which enters the hose provided with non-angular threads, said shank provided with means comprising a circumferentially broken or faceted surface or flange adapted to engage with and be turned by an independent wrench and a suitable clamping device on the hose circumscribing the plain portion of the shank.

7. A hose-connection device comprising a suitable coupling having a tapering shank adapted to enter a hose and a two-part clamp adapted to embrace said hose having projecting flanges $c$ with ribs $c'$ and an inwardly-projecting rib $C^2$ raised above the normal interior surface of the clamp.

8. A coupling having a tapering shank adapted to enter a hose and having means adapted to be turned by an independent wrench comprising a circumferentially broken or faceted surface or flange and provided with non-angular threads extending a portion of its length, the remainder of said shank being plain and a compression device adapted to compress the hose upon the plain portion of the shank, whereby the threads form a shoulder to resist the withdrawal of the shank.

PATRICK H. REARDON.

Witnesses:
 WM. A. HEWITT,
 A. W. STAUFFER.